United States Patent
Lindgren et al.

(10) Patent No.: US 12,479,136 B2
(45) Date of Patent: Nov. 25, 2025

(54) DEVICE FOR REINFORCING, SEALING OR DAMPING A STRUCTURAL ELEMENT

(71) Applicant: SIKA TECHNOLOGY AG, Baar (CH)

(72) Inventors: Henrik Lindgren, Feluy (BE); Vincent Belpaire, Uccle (BE)

(73) Assignee: SIKA TECHNOLOGY AG, Baar (CH)

( * ) Notice: Subject to any disclaimer, the term of this patent is extended or adjusted under 35 U.S.C. 154(b) by 728 days.

(21) Appl. No.: 17/269,844

(22) PCT Filed: Aug. 27, 2019

(86) PCT No.: PCT/EP2019/072889
§ 371 (c)(1),
(2) Date: Feb. 19, 2021

(87) PCT Pub. No.: WO2020/043743
PCT Pub. Date: Mar. 5, 2020

(65) Prior Publication Data
US 2021/0221444 A1    Jul. 22, 2021

(30) Foreign Application Priority Data
Aug. 31, 2018    (EP) ..................... 18192093

(51) Int. Cl.
*B29C 44/18*    (2006.01)
*B62D 29/00*    (2006.01)
(Continued)

(52) U.S. Cl.
CPC .......... *B29C 44/188* (2013.01); *B62D 29/002* (2013.01); *B29L 2031/3002* (2013.01); *B62D 25/08* (2013.01)

(58) Field of Classification Search
CPC ................... B29C 44/188; B29C 44/18; B29L 2031/3002; B62D 25/08; B62D 29/002;
(Continued)

(56) References Cited

U.S. PATENT DOCUMENTS 5,358,397 A    10/1994    Ligon et al.
6,103,341 A *   8/2000    Barz ................. B29C 44/445
                                               277/630
(Continued)

FOREIGN PATENT DOCUMENTS

DE         10143550 C1      10/2002
DE    112012001291 T5 *    1/2014  ............ B29C 65/52
(Continued)

OTHER PUBLICATIONS

Kim (KR 101428417 B1), machine translation (Year: 2014).*
(Continued)

*Primary Examiner* — Amy R Weisberg
*Assistant Examiner* — Wenwei Zhuo
(74) *Attorney, Agent, or Firm* — Oliff PLC

(57) ABSTRACT

A device for reinforcing, sealing, or damping a structural element in a motor vehicle including a carrier, having a first lateral region and a second lateral region, and a first adhesive for connecting the carrier to the structural element. The first adhesive is arranged on the first lateral region of the carrier. The second lateral region of the carrier is designed in such a way that a second adhesive, which can be pumped or extruded onto the structural element or onto the second lateral region of the carrier, is supported by the second lateral region of the carrier during and/or after its activation.

9 Claims, 5 Drawing Sheets

(51) Int. Cl.
*B29L 31/30* (2006.01)
*B62D 25/08* (2006.01)

(58) Field of Classification Search
CPC ...... B62D 29/005; B62D 25/04; B60R 13/08; B60R 13/0815; B60R 13/0846
USPC ............... 296/193.02, 187.02, 39.3, 1.06
See application file for complete search history.

(56) References Cited

U.S. PATENT DOCUMENTS

| | | | | |
|---|---|---|---|---|
| 6,114,004 | A * | 9/2000 | Cydzik | B62D 29/002 428/192 |
| 6,146,565 | A * | 11/2000 | Keller | B62D 29/002 29/522.1 |
| 6,494,525 | B1 * | 12/2002 | Blank | B62D 29/002 296/187.02 |
| 7,043,815 | B2 | 5/2006 | Lande et al. | |
| 7,077,461 | B2 | 7/2006 | Ratet | |
| 8,028,799 | B2 | 10/2011 | Hasler et al. | |
| 9,149,985 | B2 * | 10/2015 | Blank | C09J 133/10 |
| 9,290,211 | B2 | 3/2016 | Belpaire | |
| 10,933,922 | B2 * | 3/2021 | Belpaire | B62D 29/005 |
| 2002/0174954 | A1 * | 11/2002 | Busseuil | B62D 25/00 156/349 |
| 2003/0137162 | A1 | 7/2003 | Kropfeld | |
| 2004/0011282 | A1 | 1/2004 | Myers et al. | |
| 2004/0239148 | A1 * | 12/2004 | Ratet | B29C 44/18 296/187.02 |
| 2008/0075864 | A1 * | 3/2008 | Billotto | C08J 9/06 427/373 |
| 2010/0015427 | A1 * | 1/2010 | Belpaire | B29C 44/18 428/223 |
| 2010/0092733 | A1 | 4/2010 | Blank et al. | |
| 2010/0213001 | A1 * | 8/2010 | Hasler | B29C 44/18 29/896.93 |
| 2012/0010367 | A1 * | 1/2012 | Prunarety | B62D 29/002 525/190 |
| 2012/0043019 | A1 * | 2/2012 | Belpaire | B62D 21/09 428/131 |
| 2013/0037152 | A1 * | 2/2013 | Belpaire | B29C 44/188 264/46.4 |
| 2015/0315782 | A1 * | 11/2015 | Belpaire | B29C 44/188 181/294 |
| 2015/0352930 | A1 * | 12/2015 | Belpaire | B62D 29/002 428/101 |
| 2016/0304133 | A1 * | 10/2016 | Belpaire | B60J 10/16 |
| 2018/0037272 | A1 * | 2/2018 | Richardson | B29C 69/02 |
| 2019/0002029 | A1 * | 1/2019 | Niggemann | B62D 25/02 |
| 2019/0070759 | A1 * | 3/2019 | Michalak | B29C 44/188 |
| 2019/0126855 | A1 * | 5/2019 | Ulmann | B60R 13/08 |
| 2019/0144041 | A1 * | 5/2019 | Belpaire | B62D 29/008 296/209 |
| 2020/0180699 | A1 * | 6/2020 | Hirose | B62D 25/04 |
| 2020/0353994 | A1 * | 11/2020 | Cauchie | B62D 29/002 |
| 2021/0163078 | A1 * | 6/2021 | Lindgren | B62D 29/002 |
| 2024/0059356 | A1 * | 2/2024 | Holmstrom | B60R 13/07 |

FOREIGN PATENT DOCUMENTS

| | | | |
|---|---|---|---|
| EP | 1591224 A1 | 11/2005 | |
| EP | 3281970 A1 | 2/2018 | |
| EP | 3 421 331 A1 | 1/2019 | |
| EP | 3 466 800 A1 | 4/2019 | |
| EP | 3 486 146 A1 | 5/2019 | |
| GB | 2463858 A * | 3/2010 | ............ B29C 44/18 |
| KR | 101428417 B1 * | 8/2014 | |
| WO | 99/37506 A1 | 7/1999 | |
| WO | 2010/010167 A1 | 1/2010 | |
| WO | 2010/023324 A1 | 3/2010 | |
| WO | 2014/124924 A1 | 8/2014 | |
| WO | 2017/182606 A1 | 10/2017 | |
| WO | 2018/017978 A1 | 1/2018 | |

OTHER PUBLICATIONS

Syvret et al. (DE 112012001291 T5), machine translation (Year: 2014).*
Nov. 8, 2019 Search Report issued in International Patent Application No. PCT/EP2019/072889.
Mar. 2, 2021 International Preliminary Report on Patentability issued in International Patent Application No. PCT/EP2019/072889.
Mar. 13, 2024 Notice of Opposition issued in European Patent No. 3844053.
www.wayback.org internet archive: http://automotive.sika.com/en/solutions_products/body-shop-structural-inserts/sikapower.html.
Souvay, D., "Car Body Reinforcement with Sika", GALM Birmingham, Apr. 2017.
Sika 2015 Brochure: "Acoustic Systems Quieter Rides Start With Sika".
Morel, N., "Lighter Vehicle Starts with Sika", Galm Birmingham, Nov. 2016.

* cited by examiner

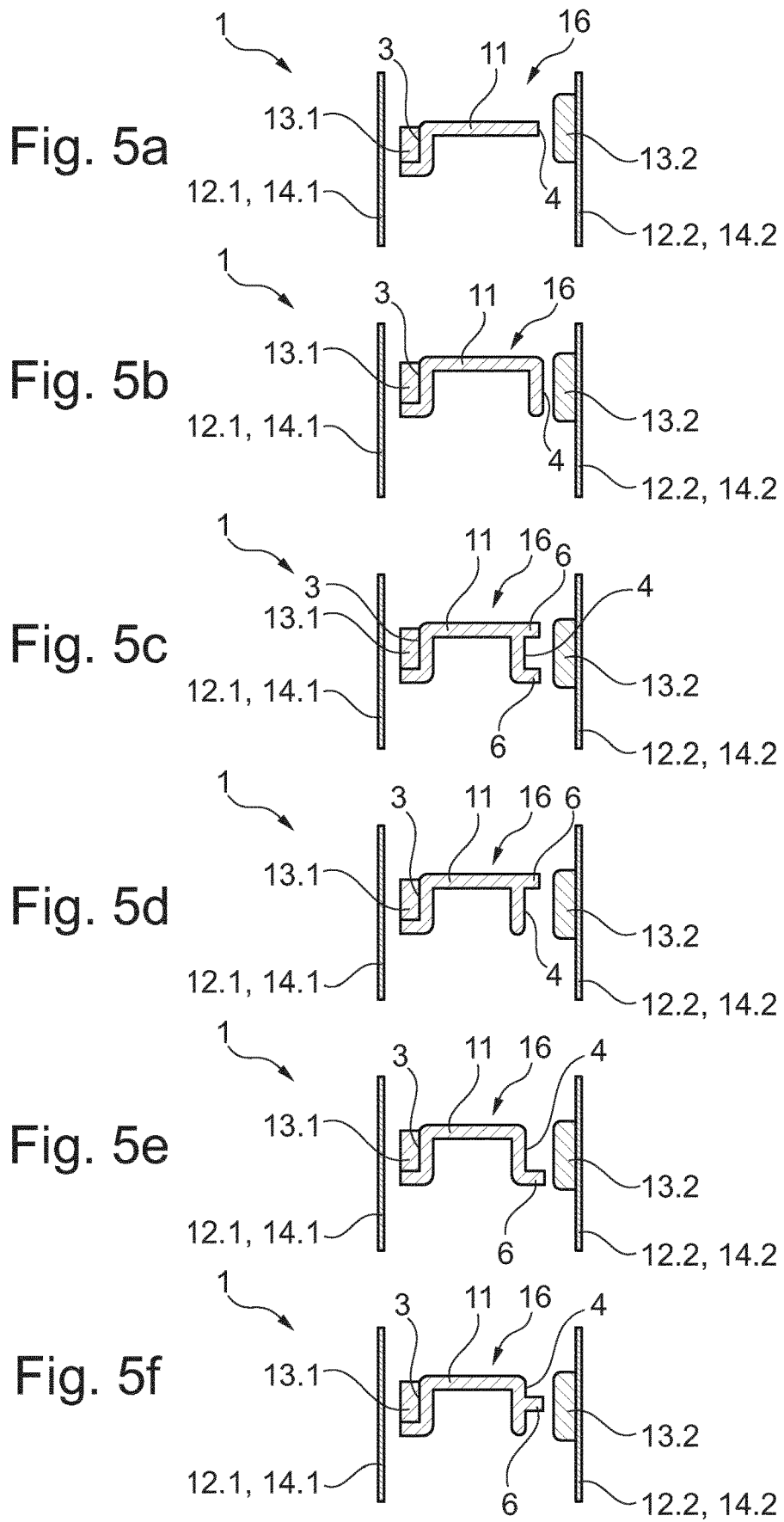

DEVICE FOR REINFORCING, SEALING OR DAMPING A STRUCTURAL ELEMENT

The invention relates to a device for reinforcing, sealing or damping a structural element, having a carrier and an adhesive. Said invention furthermore relates to a system having a structural element and a device arranged therein, and also to a method for reinforcing, sealing or damping a structural element.

In many cases, components, such as for example bodies and/or frames of transportation and conveyance means, in particular of aquatic or terrestrial vehicles or of aircraft, have structures with cavities in order to make lightweight constructions possible. However, these cavities cause a wide variety of problems. Depending on the nature of the cavity, it has to be sealed in order to prevent the ingress of moisture and dirt, which can lead to corrosion of the components. It is often also desirable to substantially reinforce the cavities, and thus the component, but to retain the low weight. It is often also necessary to stabilize the cavities, and thus the components, in order to reduce noises which would otherwise be transmitted along or through the cavity. Many of these cavities have an irregular shape or a narrow extent, making it more difficult to seal, reinforce and damp them properly.

In particular in automotive construction, but also in aircraft construction and boat building, sealing elements (baffles) are therefore used in order to seal and/or acoustically insulate cavities, or reinforcing elements (reinforcers) are used in order to reinforce cavities.

FIG. 1 schematically illustrates a body of an automobile. Here, the vehicle body 10 has various structures with cavities, such as for example pillars 14 and carriers or braces 12. Such structural elements 12, 14 with cavities are usually sealed and/or reinforced, respectively, using sealing and/or reinforcing elements 16.

FIGS. 2a and 2b schematically show a known concept for the sealing and/or reinforcing closure of openings or cavities in a motor vehicle.

Here, FIG. 2a shows a device 16 prior to an expansion of an adhesive 13. FIG. 2b shows the same device 16 as a constituent part of the system 1 but after the adhesive 13 has been expanded, that is to say with the expanded adhesive 13'.

The device 16 is located in a cavity of a vehicle body structure, as is illustrated for example in FIG. 1. A portion of such a structural element 12, 14 of a vehicle body is schematically illustrated in FIGS. 2a and 2b. The device 16 comprises a carrier 11, which has an edge region 21. The adhesive 13 is in this case arranged substantially on this edge region 21 of the carrier 11.

A gap exists between the device 16 and the structural element 12, 14 prior to the expansion of the adhesive 13. Said gap makes it possible to coat the structural element 12, 14 in order to achieve corrosion protection of the structural element 12, 14. After this coating, the adhesive 13 is usually expanded by the action of heat, the expanded adhesive 13' closing the gap between the device 16 and the structural element 12, 14 as a result. Fixing of the device 16' in the structural element 12, 14 is moreover also simultaneously achieved as a result of the expansion of the adhesive 13. A device 16' that is fastened in the structural element 12, 14 in this way on the one hand reinforces the structural element 12, 14 and on the other hand closes the cavity in the structural element 12, 14.

The invention is based on the object of providing an improved device for reinforcing, sealing or damping a structural element. The intention in particular is for such a device to have a constant or improved function with regard to the reinforcement, sealing or damping of the structural element, and at the same time for tool costs and the process complexity to be reduced.

This object is achieved by a device for reinforcing, sealing or damping a structural element in a motor vehicle, comprising: a carrier having a first lateral region and a second lateral region; and a first adhesive for bonding the carrier to the structural element, wherein the first adhesive is arranged on the first lateral region of the carrier; wherein the second lateral region of the carrier is formed in such a way that a second adhesive, which can be pumped or extruded onto the structural element or onto the second lateral region of the carrier, is supported by the second lateral region of the carrier during and/or after the activation of said second adhesive.

This solution has the advantage that, by providing a first adhesive in combination with a separately arranged second adhesive, a system can be provided which is better geared to the respective requirements, because the first adhesive and the second adhesive can be different and thus can be ideally adapted to the individual requirements. At the same time, the process complexity is low, because the solution proposed here can ensure new functionalities with simple systems (two-component devices and extrudable or pumpable adhesives). The tool costs can also be reduced or maintained, since the solution proposed here allows complex functionalities, which usually require complex production processes, with simple means, such as for example two-component injection molding.

A core concept of the present invention is that a first adhesive which is already arranged on the carrier is combined with a second adhesive which is subsequently introduced into the system, in order to bring about an improved device for reinforcing, sealing or damping the structural element overall. A major advantage of this solution can be considered that, in the process, the first adhesive and the second adhesive can be freely combined with one another in principle. By way of example, a first adhesive having a damping function can be combined with a second adhesive having a reinforcing function, or a first adhesive having one reinforcing function can be combined with a second adhesive having a second reinforcing function with other parameters. Overall, the solution proposed here makes it possible to meet a very wide variety of requirements with respect to the reinforcement, sealing or damping of structural elements using cost-effective means of low complexity.

The solution proposed here offers the advantage that the second adhesive can be applied in an automated manner, for example by robots. Labor costs can thus be saved, and the precision and constancy of the application can be improved.

The solution also has the advantage that the second adhesive can be provided in the form of bulk product. This is advantageous in particular in comparison with systems in which prefabricated elements, instead of the second adhesive used here, are used. In order to prefabricate such elements to size and in bulk, considerable production and logistics outlay is necessary, which can be avoided with the present invention.

The solution also has the advantage that, by virtue of the second adhesive, which is applied onto the structural element and/or onto the carrier, the regions of the joining points of the structural element can already be filled before the second adhesive is activated. This is advantageous in particular in comparison with systems in which prefabricated elements, instead of the second adhesive used here, are used, since such prefabricated elements cannot fill the regions of the joining points, or can only inadequately fill the regions of the joining points, this resulting in poorer reinforcement and/or sealing and/or damping of the structural element.

A further advantage of this solution is that a single standardized device can be used for a variety of structural elements. In this case, the device in particular fills a majority of the cavity in the structural element with the first adhesive. The second adhesive is used in particular in regions of the cavity which are difficult to access, and thus difficult to fill, using the device. Since the second adhesive is applied individually, the amount and the shape of the second adhesive can be adapted individually to the respective structural element. It is thus the case that no individual devices need to be produced for different structural elements or for different cavities of the structural element, it rather being the case that a large spectrum of different structural elements can be covered with one standardized device or with a few standardized devices in conjunction with the second adhesive.

In one exemplary embodiment, the first lateral region and the second lateral region of the carrier are arranged substantially opposite one another.

In one exemplary embodiment, the first lateral region and the second lateral region of the carrier are formed in such a way that they face respectively opposite inner walls of the structural element in an intended state of use of the device in the structural element.

In one exemplary embodiment, the carrier is formed in such a way that the second lateral region is spaced apart from the structural element by between 1 and 10 mm, preferably between 1 and 6 mm, particularly preferably between 2 and 5 mm, in an intended state of use.

Such a formation of the carrier and in particular of the second lateral region has the advantage that, as a result, a support function of the second lateral region for second adhesives, which have a relatively low expansion rate, during and/or after the activation of said second adhesive can be better configured.

In an exemplary alternative embodiment, the carrier is formed in such a way that the second lateral region is spaced apart from the structural element by between 20 and 80 mm, preferably between 25 and 70 mm, particularly preferably between 30 and 60 mm, in an intended state of use.

Such a formation of the carrier and in particular of the second lateral region has the advantage that, as a result, a support function of the second lateral region for second adhesives, which have a relatively high expansion rate, during and/or after the activation of said second adhesive can be better configured.

In one exemplary embodiment, the second lateral region has an extent in the direction of a longitudinal axis of the structural element (with respect to an intended state of use of the device in the structural element) of between 5 and 50 mm, preferably between 10 and 40 mm, particularly preferably between 15 and 35 mm.

Such an extent of the second lateral region in turn has the advantage that, as a result, during and/or after the activation of the second adhesive, said second adhesive can be supported better by the second lateral region of the carrier.

In one exemplary embodiment, the second lateral region has at least one projection which projects away from the second lateral region.

In one exemplary refinement, said projection is in the form of an elongate rib.

In one exemplary embodiment, the projection in the form of an elongate rib is formed substantially in the direction of the longitudinal axis of the structural element or else substantially in the direction transverse to the longitudinal axis of the structural element.

In one exemplary embodiment, the projection is arranged substantially at an edge of the second lateral region or else substantially in a central region of the second lateral region.

In one exemplary embodiment, the second lateral region has one or two or three or four or more than four projections.

The configuration and arrangement of such projections on the second lateral region of the carrier depends on the type and the arrangement of the second adhesive. By way of example, second adhesives which expand greatly can be combined with other second lateral regions and/or projections than less-expandable or non-expandable second adhesives. The shape of the second lateral region of the carrier, and in particular the projections thereof, can accordingly be adapted to the respective second adhesive.

In one exemplary embodiment, an extent of the first lateral region in the direction of a longitudinal axis of the structural element is smaller than, equal to or larger than an extent of the second lateral region in the direction of a longitudinal axis of the structural element.

In turn, the configuration and extent of the lateral regions can be adapted to the respectively selected adhesives.

In one exemplary embodiment, the carrier has at least one fastening element for the arrangement of the device in the structural element.

In one exemplary refinement, said fastening element is in the form of a clip.

Said fastening element in particular has the function of fixing the device in an intended position in the structural element until the adhesives have been activated and then ultimately retain the carrier in the structural element.

In one exemplary embodiment, the fastening element is arranged on the first lateral region of the carrier.

In one exemplary embodiment, the second lateral region of the carrier does not have a fastening element.

In one exemplary embodiment, the carrier and the fastening element are formed in one piece.

In a further exemplary embodiment, the carrier and the fastening element are formed from the same material.

In one exemplary embodiment, the first adhesive is arranged on the carrier by an injection-molding process.

In one exemplary embodiment, the carrier is produced by an injection-molding process.

In one exemplary embodiment, the carrier and the first adhesive are produced by a two-component injection-molding process.

In one exemplary embodiment, the carrier comprises a plastic, in particular polyamide.

In one exemplary embodiment, the carrier comprises a fiber-reinforced plastic, in particular a glass fiber-reinforced or carbon fiber-reinforced plastic.

In principle, the carrier can be composed of a variety of materials. Preferred materials are plastics, in particular polyurethanes, polyamides, polyesters and polyolefins, preferably polymers which can withstand high temperatures such as poly(phenylene ethers), polysulfones or polyether sulfones, which in particular are also foamed; metals, in particular aluminum and steel; or grown organic materials, in particular wood materials or other (densified) fibrous materials, or glass-type or ceramic materials; especially also foamed materials of this type; or any desired combinations of these materials. Polyamide, in particular polyamide 6, polyamide 6.6, polyamide 11, polyamide 12, or a mixture thereof, is particularly preferably used. Combinations with fibers, such as, for example, glass fibers or carbon fibers, are also possible.

Furthermore, the carrier can have any desired construction and any desired structure. It can be, for example, solid, hollow or foamed, or have a grid-like structure. Typically, the surface of the carrier can be smooth, rough or structured.

In one exemplary embodiment, the first adhesive forms a single cohesive element. In an alternative embodiment, a plurality of non-cohesive first adhesives form a plurality of non-cohesive elements.

In one exemplary embodiment, the first adhesive has an expansion rate of 300 to 3000%. In one exemplary development, the first adhesive has an expansion rate of between 1000 and 2700% or between 1500 and 2500%.

An exemplary material with such an expansion rate can be obtained under the trade name SikaBaffle® 455.

In an alternative embodiment, the first adhesive has an expansion rate of 50 to 500%. In one exemplary development, the first adhesive has an expansion rate of between 70 and 400% or between 100 and 300%.

An exemplary material with such an expansion rate can be obtained under the trade name SikaReinforcer® 940.

In a further alternative embodiment, the first adhesive is a substantially non-expandable adhesive. In this case, when it is activated, the adhesive may nonetheless experience a slight change in volume. In one exemplary embodiment, such a first adhesive has an expansion rate of less than +/−15% or of less than +/−10% or of less than +/−5%.

An exemplary material of such a substantially non-expandable adhesive can be obtained under the trade name SikaPower®.

The object set out in the introduction is additionally achieved by a system for reinforcing, sealing or damping a structural element in a motor vehicle, the system comprising: a structural element; a device according to the above description, wherein the device is arranged in the structural element; and a second adhesive, which is pumped or extruded onto the structural element and/or onto the second lateral region of the carrier.

In one exemplary embodiment, the second adhesive is pumped or extruded onto the second lateral region or onto the structural element in the form of a bead or a plurality of beads.

In one exemplary embodiment, the second adhesive forms a single cohesive element. In an alternative embodiment, a plurality of non-cohesive second adhesives form a plurality of non-cohesive elements.

In one exemplary embodiment, in the region of at least one joining point of the structural element, the second adhesive is in contact both with a first constituent part of the structural element and with a second constituent part of the structural element.

This has the advantage that, as a result, the region of the joining points can be better reinforced and/or sealed and/or damped.

In one exemplary embodiment, the second adhesive is pumpable at a temperature of less than 80° C., preferably of less than 70° C., preferably of less than 60° C., particularly preferably of less than 50° C.

In one exemplary embodiment, the second adhesive is extrudable at a temperature of less than 100° C., preferably of less than 90° C., preferably of less than 80° C., particularly preferably of less than 70° C.

In one exemplary embodiment, the second adhesive is pumpable or extrudable at a temperature which is below an activation temperature of the second adhesive by at least 20 K or by at least 30 K or by at least 40 K or by at least 50 K or by at least 60 K.

In one exemplary embodiment, the second adhesive has an expansion rate of 300 to 3000%. In one exemplary development, the second adhesive has an expansion rate of between 1000 and 2700% or between 1500 and 2500%.

An exemplary material with such an expansion rate can be obtained under the trade name SikaBaffle® 455.

In an alternative embodiment, the second adhesive has an expansion rate of 50 to 500%. In one exemplary development, the second adhesive has an expansion rate of between 70 and 400% or between 100 and 300%.

An exemplary material with such an expansion rate can be obtained under the trade name SikaReinforcer® 940.

In a further alternative embodiment, the second adhesive has an expansion rate of at least 200% or at least 300% or at least 400% or at least 500%.

Such an expandable and pumpable adhesive is described, by way of example, in European patent application EP 3 281970 A1.

An exemplary material with such an expansion rate can be obtained under the trade name SikaSeal®.

In a further alternative embodiment, the first adhesive is a substantially non-expandable adhesive. In this case, when it is activated, the adhesive may nonetheless experience a slight change in volume. In one exemplary embodiment, such a first adhesive has an expansion rate of less than +/−15% or of less than +/−10% or of less than +/−5%.

An exemplary material of such a substantially non-expandable adhesive can be obtained under the trade name SikaPower®.

The object set out in the introduction is also achieved by a method for reinforcing, sealing or damping a structural element in a motor vehicle, the method comprising: providing a device according to the above description; arranging the device on a first constituent part of the structural element; arranging a second adhesive on the second lateral region of the carrier or on a second constituent part of the structural element; joining the first constituent part and the second constituent part of the structural element to form the structural element, wherein the device and the second adhesive are arranged substantially between the first constituent part and the second constituent part; and activating the first adhesive and the second adhesive.

In one exemplary embodiment, the second adhesive is arranged on the second lateral region of the carrier or on a second constituent part of the structural element by a robot.

In one exemplary embodiment, the second adhesive is arranged before or after the device is arranged on the first constituent part of the structural element.

In one exemplary embodiment, heat is employed during the activation of the first adhesive and of the second adhesive, in particular the adhesives are activated in a finishing oven.

Details and advantages of the invention will be described below on the basis of exemplary embodiments and with reference to schematic drawings, in which:

FIGS. 3a to 6b show schematic illustrations of exemplary systems for reinforcing, sealing or damping a structural element.

Figure 1:
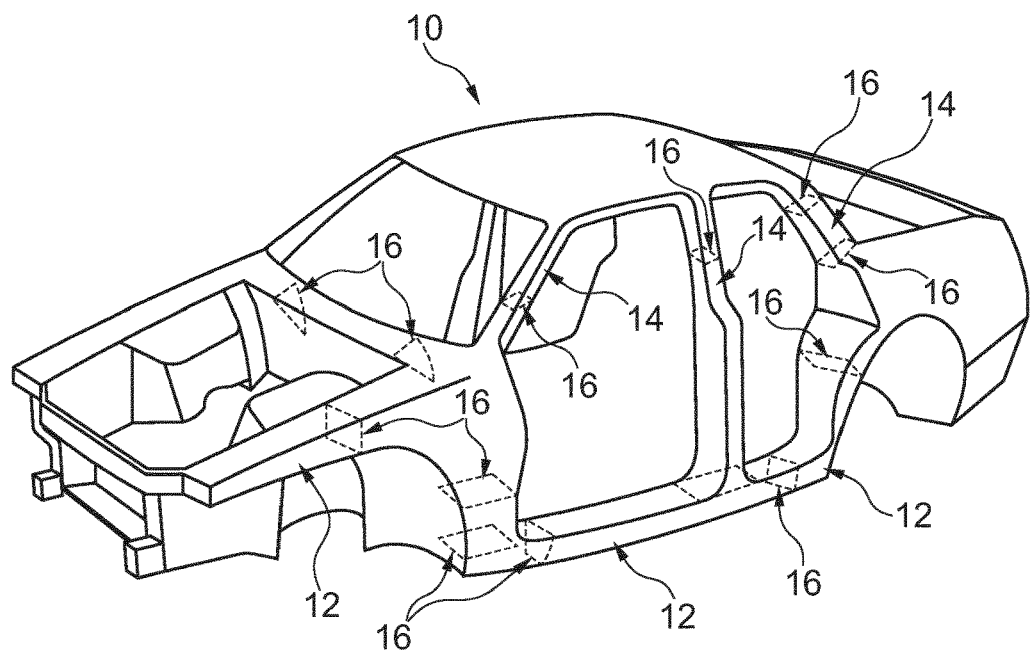
FIG. 1 shows an exemplary illustration of a vehicle body according to the prior art.
Figure 2A:
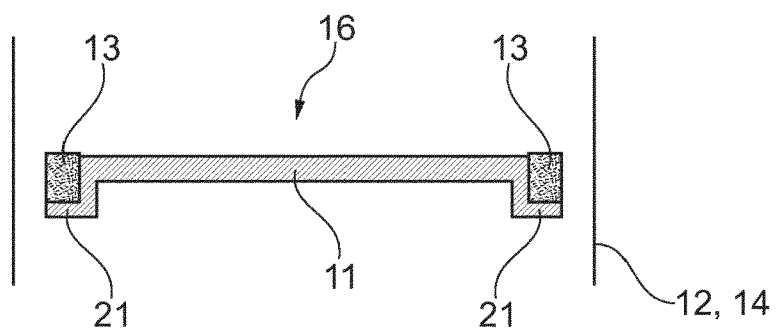
FIGS. 2a and 2b show schematic illustrations of an exemplary device according to the prior art.
Figure 2B:
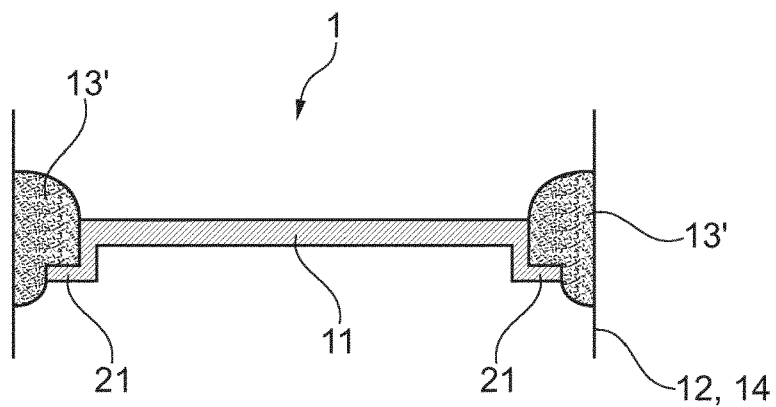
Figure 3A:
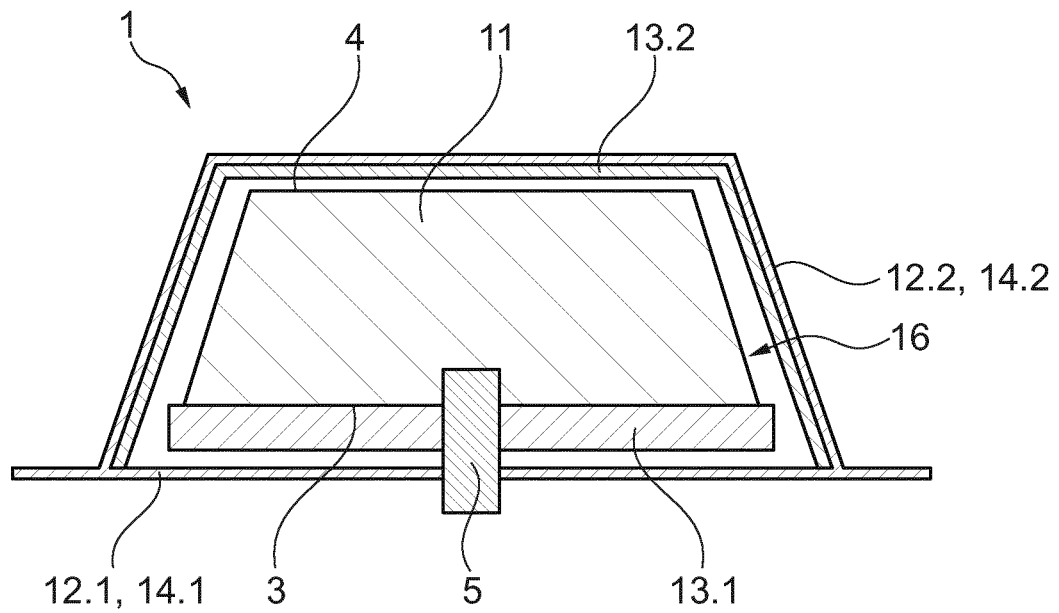
Figure 3B:
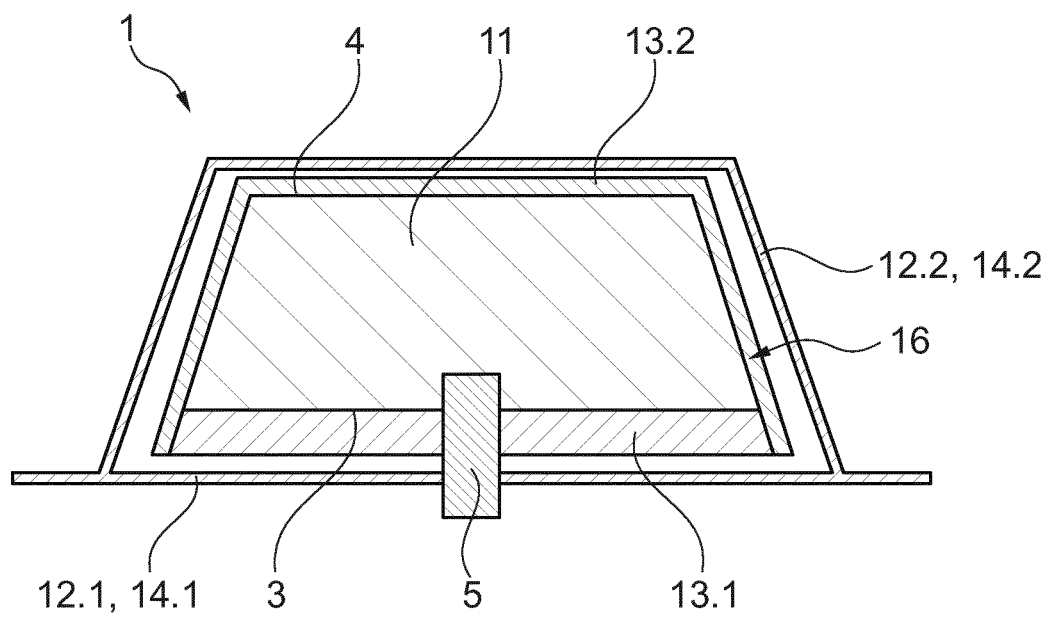

FIGS. 3a and 3b illustrate, schematically and by way of example, different variants of a first system 1 for reinforcing, sealing or damping a structural element 12, 14. Here, a device 16 having a carrier 11 and a first adhesive 13.1 arranged on the carrier 11 is arranged in a structural element 12, 14. In this respect, the structural element 12, 14 comprises a first constituent part 12.1, 14.1 and a second constituent part 12.2, 14.2.

The device 16 is arranged on the first constituent part 12.1, 14.1 of the structural element 12, 14 by a fastening element 5.

The carrier 11 of the device 16 has a first lateral region 3 and a second lateral region 4. Here, the first lateral region 3 and the second lateral region 4 are arranged substantially opposite one another. The first adhesive 13.1 is arranged on the first lateral region 3 of the carrier. The second adhesive 13.2 is pumped or extruded onto the structural element 12, 14 (FIG. 3a) or onto the second lateral region 4 (FIG. 3b).

The system 1 is illustrated in a state prior to an activation of the adhesives 13.1, 13.2. In this exemplary embodiment, the two adhesives 13.1, 13.2 are in the form of expandable adhesives. The adhesives 13.1, 13.2 consequently expand during the activation thereof and as a result bridge a gap between the carrier 11 and the structural element 12, 14, with the result that, after the activation of the adhesives 13.1, 13.2, the carrier 11 is connected to the structural element 12, 14 by the adhesives 13.1, 13.2.

Figure 4A:
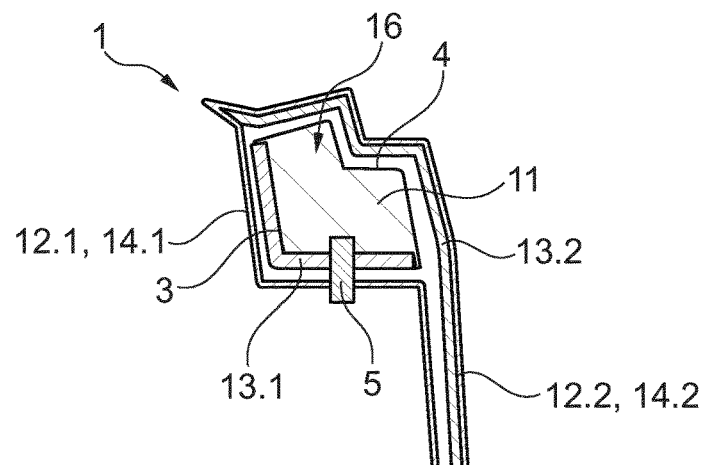
Figure 4B:
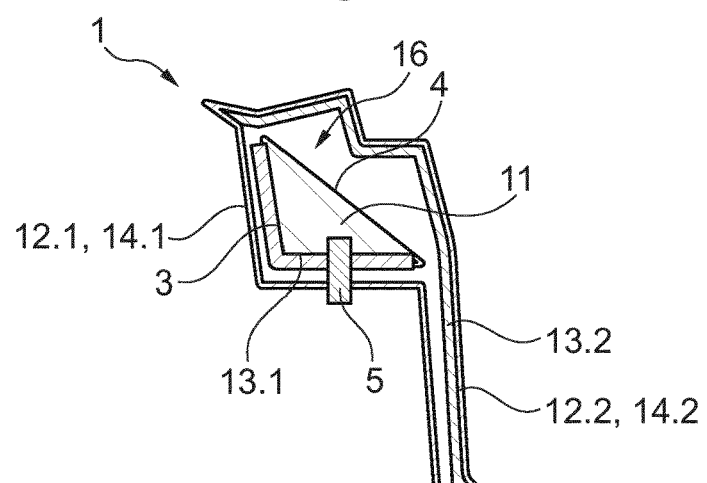
Figure 4C:
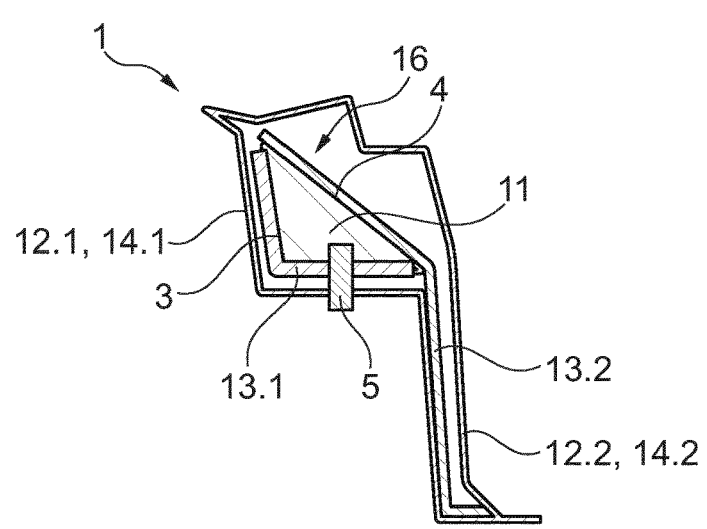

FIGS. 4a to 4c illustrate three variants of a further exemplary and schematically illustrated embodiment. By contrast to the exemplary embodiment in FIGS. 3a and 3b, a cavity in the structural element 12, 14 in FIGS. 4a to 4c has an elongate region which is difficult to access. As is clear from this exemplary embodiment, the solution proposed here is suitable in particular for also reaching such regions of structural elements that are difficult to access with the second adhesive 13.2.

In particular, here, the second adhesive 13.2 is applied in such a way that, in regions of joining points of the structural element 12, 14, the second adhesive 13.2 is in contact both with the first constituent part 12.1, 14.1 and with the second constituent part 12.2, 14.2 of the structural element 12, 14, before the second adhesive 13.2 is activated. The result of this is a particularly good sealing and/or reinforcement and/or damping of these regions of the structural element 12, 14 that are difficult to access.

FIGS. 5a to 5f illustrate, schematically and by way of example, cross sections of a variety of systems 1. It is shown schematically here that the second lateral region 4 of the carrier 11 can have different configurations. On the one hand, an extent of the second lateral region 4 in the longitudinal direction of the structural element 12, 14 can have different configurations. By way of example, this extent is thus smaller in FIG. 5a than in FIGS. 5b to 5f. On the other hand, the configuration of the second lateral region 4 can have different forms. By way of example, one or more projections 6 can be arranged on the second lateral region 4. In this case, these projections 6 can be arranged at an edge of the second lateral region (FIGS. 5c, 5d and 5e) or in a central region of the second lateral region 4 (FIG. 5f).

The projections 6 can in particular be in the form of elongate ribs.

It is clear in FIGS. 5a to 5f that the second lateral region 4 of the carrier 11 is configured and arranged in such a way that the second adhesive 13.2 is supported by the second lateral region 4 during and/or after the activation of said second adhesive.

Figure 6A:
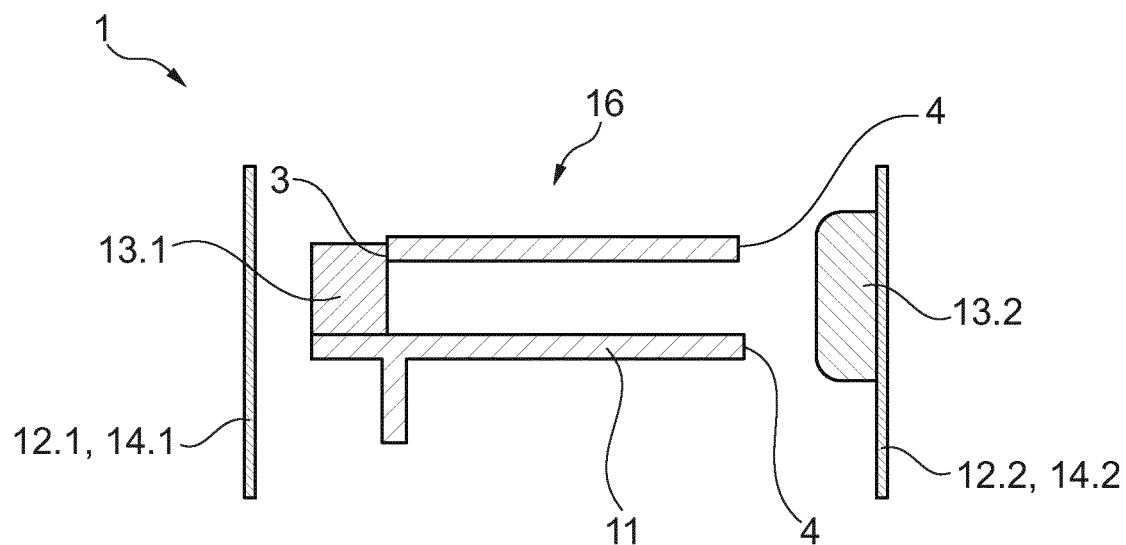
Figure 6B:
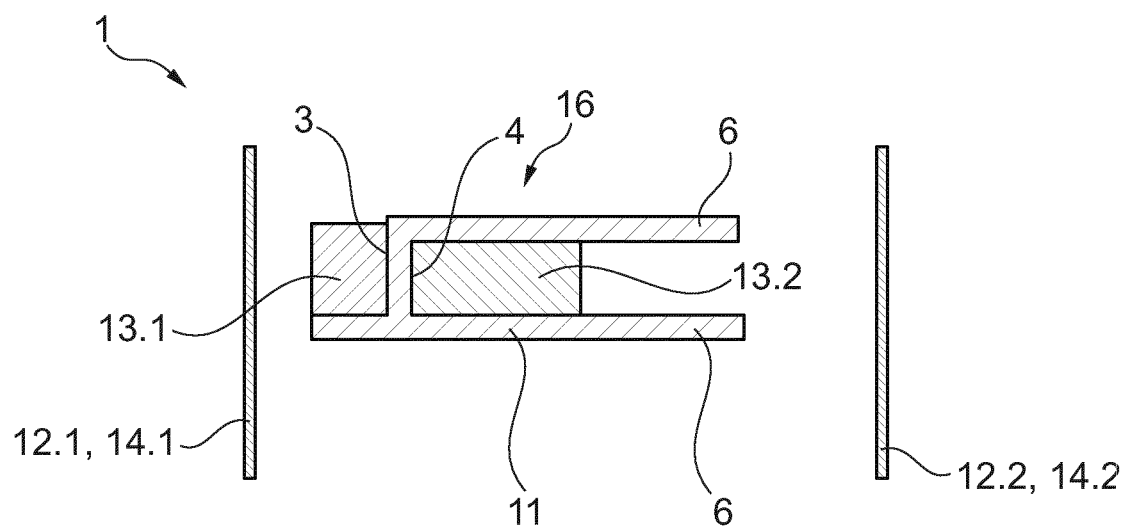

FIGS. 6a and 6b illustrate a further exemplary and schematically illustrated embodiment of a system 1 for reinforcing, sealing or damping a structural element. In this exemplary embodiment, the carrier 11 has a substantially double-walled cross section.

In FIG. 6a, the second adhesive 13.2 is pumped or extruded onto the structural element 12, 14. In FIG. 6b, the second adhesive 13.2 is pumped or extruded onto the second lateral region 4 of the carrier 11.

LIST OF REFERENCE SIGNS

1 System
3 First lateral region
4 Second lateral region
5 Fastening element
6 Projection
10 Vehicle body
11 Carrier
12 Structural element
12.1 First constituent part
12.2 Second constituent part
13 Adhesive
13.1 First adhesive
13.2 Second adhesive
14 Structural element
14.1 First constituent part
14.2 Second constituent part
16 Device
21 Edge region

The invention claimed is:

1. A system for reinforcing, sealing or damping a structural element in a motor vehicle, the system comprising:
   a structural element;
   a carrier in the structural element and having a first lateral region and a second lateral region;
   a first adhesive bonding the carrier to the structural element, wherein the first adhesive is on the first lateral region of the carrier; and
   a second adhesive pumped or extruded to be between the structural element and the second lateral region of the carrier, while the carrier is in the structural element, so that the second lateral region of the carrier is supported by the second adhesive, wherein
      the second adhesive is a different adhesive than, and independently applied from, the first adhesive.

2. The system as claimed in claim 1, wherein the first lateral region and the second lateral region of the carrier are substantially opposite one another.

3. The system as claimed in claim 1, wherein the second lateral region has an extent in the direction of a longitudinal axis of the structural element of between 5 and 50 mm.

4. The system as claimed in claim 1, wherein the second lateral region has at least one projection, which projects away from the second lateral region.

5. The system as claimed in claim 4, wherein the projection is an elongate rib.

6. The system as claimed in claim 1, wherein the carrier has at least one fastening element for arrangement of the carrier in the structural element.

7. The system as claimed in claim 1, wherein the second lateral region does not have a fastening element.

8. The system as claimed in claim 1, wherein the first adhesive is an expandable adhesive.

9. The system as claimed in claim 1, wherein the second adhesive is pumped or extruded onto the second lateral region or onto the structural element in a bead or a plurality of beads.

* * * * *